3,151,939
PROCESS FOR PREPARING ALUMINA HYDRATE HAVING 1.2 TO 2.6 MOLES OF WATER OF HYDRATION
William L. Kehl, Indiana Township, Allegheny County, and Meredith M. Stewart, Penn Hills Township, Allegheny County, Pa., assignors to Gulf Research & Development Company, Pittsburgh, Pa., a corporation of Delaware
No Drawing. Filed June 20, 1961, Ser. No. 118,241
4 Claims. (Cl. 23—143)

This invention relates to a crystalline alumina hydrate which has the approximate formula $Al_2O_3 \cdot 1.2$–$2.6H_2O$ and to a process for its preparation.

Alumina hydrates, which are precursors for catalytic aluminas, exist in a variety of forms. Each hydrate form is distinct from the others and upon dehydration yields a corresponding alumina having distinct physical and catalytic properties. The various hydrates include both amorphous and crystalline forms. Included among the crystalline forms are bayerite and boehmite. Bayerite is an alumina trihydrate, $Al_2O_3 \cdot 3H_2O$, and upon dehydration yields the catalytic alumina known as eta alumina. Boehmite is an alumina monohydrate, $Al_2O_3 \cdot H_2O$, and upon dehydration produces the catalytic alumina known as gamma alumina. The crystalline alumina hydrate prepared in accordance with this invention contains an intermediate quantity of water of hydration having less water of hydration than bayerite but more water of hydration than boehmite and having the approximate formula $Al_2O_3 \cdot 1.2$–$2.6H_2O$, but more commonly, $$Al_2O_3 \cdot 1.4$–$2.4H_2O$$

Upon dehydration this intermediate hydrate produces a distinct but not yet defined catalytic alumina form which is neither the eta alumina produced from bayerite nor the gamma alumina produced from boehmite.

That the intermediate alumina hydrate of this invention differs distinctly as a composition of matter as compared to both the higher hydrate, bayerite, and the lower hydrate, boehmite, is evident in many respects. One respect is that the intermediate alumina hydrate of this invention, following drying and calcination, when employed with iron group metals or noble metals, or mixtures thereof, results in catalysts of high activity in hydrogenative hydrocarbon conversion processes. For example, when the calcined anhydride of which the intermediate alumina of this invention is a precursor is employed as a support for certain catalytically active metals including platinum, palladium, nickel, cobalt, molybdenum, etc. the resulting catalyst possesses an especially high activity for the hydrogenative removal from hydrocarbon oils of deleterious impurities such as sulfur or nitrogen, as compared to eta alumina or gamma alumina, of which bayerite and boehmite, respectively, are precursors. The calcination product of the intermediate hydrate of this invention also has a distinct size distribution of pores in comparison to the calcination products of both bayerite and boehmite as determined by nitrogen adsorption tests.

Another distinction between the intermediate alumina hydrate of this invention, the higher hydrate, bayerite, and the lower hydrate, boehmite, is apparent by virtue of the differing water loss characteristics of each during calcination. Bayerite, after being dried at about 250° F. for the removal of mechanically held water, upon further heating or calcination starts to lose its chemically bound water at about 360° F. and its water loss is substantially complete at about 480° F., containing less than 3 percent by weight of water at the latter temperature. The bayerite is not converted to eta alumina until the heating temperature reaches 450° F. Boehmite, after drying at about 250° F. for removal of mechanically held water, upon continued heating does not commence to lose its chemically bound water until reaching the temperature 750° F. and its water loss is substantially completed at about 930° F., at which temperature it contains less than 3 percent by weight of water. The conversion of boehmite to gamma alumina occurs at 850° F. The intermediate alumina hydrate of this invention, after losing its mechanically held water by drying at 250° F., upon further heating starts to lose its chemically bound water at 360° F. and completes its water loss at 930° F., at which temperature it contains less than 3 percent by weight of water. It achieves its, as yet undefined, anhydride structural state at 850° F. in which state the anhydride is substantially completely free of both eta alumina derived from bayerite and gamma alumina derived from boehmite. The discovery of distinct water loss temperature ranges for the various hydrates shows that each is distinct structurally from the other. It was also observed by X-ray diffraction tests that the intermediate hydrate of this invention does not dehydrate via the monohydrate, or boehmite, state. Therefore, both the drying data and X-ray diffraction data show that the anhydride of the intermediate alumina is distinct structurally from both eta alumina, derived from bayerite and gamma alumina derived from boehmite.

The conventional method for the preparation of an alumina hydrate is by preparing separate aqueous solutions, the first aqueous solution containing aluminum ions and the second aqueous solution containing hydroxyl ions. According to the conventional method the solution containing hydroxyl ions is added to the solution containing aluminum ions. However, this conventional method does not produce a single hydrate of high purity but rather a random mixture of various hydrates. For example, if the aqueous solution containing aluminum ions is aqueous aluminum chloride and the aqueous solution containing hydroxyl ions is aqueous ammonium hydroxide, before any hydroxide is added to the aluminum chloride solution the pH of this latter solution is about 2.3 The addition of ammonium hydroxide to the aluminum chloride solution causes its pH to increase and within the pH range 3 to 4.5 non-filterable but non-ionic colloidal sol forms having the formula $Al(OH)_xCl_y$, where $x+y=3$. With continued addition of ammonium hydroxide, the dispersed non-ionized sol sets to a gel upon attaining a pH of about 5 to 5.5. Upon the formation of the gel the solution sets to such a high consistency that effective stirring is no longer possible. The product of this method is not a single hydrate but a varying mixture of hydrates including substantial quantities of bayerite, amorphous alumina and other hydrate forms such as gibbsite and nordstrandite.

The formation of a sol and a gel in the preparation of alumina hydrate can be avoided by mixing an aqueous solution containing aluminum ions, such as aqueous aluminum chloride, and an aqueous solution containing hydroxide ions, such as aqueous ammonium hydroxide, at pH values in the basic range. This can be accomplished by adding small increments of aqueous aluminum chloride solution accompanied by thorough mixing to aqueous ammonium hydroxide. With sufficiently small increments of aluminum chloride solution added sufficiently slowly and with adequate agitation, localized zones of pH below 7 are substantially completely avoided. Reaction in this manner results in a mixed solution having pH values between about 12 and 7 and within this range a crystalline alumina precipitate is formed.

When forming a crystalline precipitate in this manner it is important that the increments of aqueous aluminum salts be added batchwise with sufficient care and slowness so that even temporary, localized zones of pH below 7 are avoided since such acidic localized zones not only reduce the purity of the crystalline precipitate being formed by inducing sol and gel formation but also peptize crystalline precipitate already formed converting it into an amorphous gel form. Once exposed to a pH below the range of this invention, crystalline alumina hydrate is irreversibly converted to an amorphous form and cannot subsequently be reconverted to the crystalline form by increasing the pH.

When the initial increments of aqueous solution of aluminum ions are added to aqueous ammonium hydroxide, the pH of the mixed solution starts to drop from a value of about 12. Within the pH range 12 to 9, the alumina hydrate precipitated is the intermediate hydrate form, $Al_2O_3 \cdot 1.2–2.6H_2O$, which only minutes after formation, starts to hydrate to the trihydrate form, bayerite. If the mixing operation occurs at room temperature, or even at temperatures up to 170° F. to 180° F., this transformation of the intermediate hydrate to bayerite proceeds rapidly. Within the pH range 12 to 9, the transformation of the intermediate hydrate to bayerite can be inhibited only by utilizing a specific means toward that end such as carrying out the mixing operation at temperatures above 170° F. or performing the mixing operation in the presence of acetate ion while maintaining the pH below 10.5 both of which means operate to inhibit transformation of the intermediate hydrate to bayerite. However, even by employing these means, trace quantities of bayerite are formed which acts as seeds or catalysts for further, more extensive hydration to bayerite if suitable conditions later present themselves. Such suitable conditions would arise by either allowing the temperature of intermediate hydrate precipitate formed at a temperature above 170° F. to fall below 170° F. while the precipitate is still wet or by removing acetate ion from intermediate hydrate precipitate formed in its presence while the precipitate is still wet.

With further addition of aqueous aluminum chloride solution to the aqueous ammonium hydroxide, the pH continues to fall until the pH range 8.5 to 7 is reached. Within the pH range 8.5 to 7 the alumina hydrate precipitate formed is also the intermediate hydrate but within this lower pH range the hydration to bayerite proceeds at a much slower rate, requiring 24 hours or more before it becomes appreciable. However, as stated, the ordinarily slow transformation of intermediate hydrate to bayerite within the pH range 8.5 to 7 is catalyzed by any trace quantities of bayerite which are present, for example, bayerite previously formed within the pH range 12 to 9.

In accordance with this invention, $Al_2O_3 \cdot 1.2–2.6HO_2$ which is superior in respect to both purity and stability against hydration to bayerite is prepared by mixing an aqueous solution containing aluminum ions and an aqueous solution containing hydroxide ions in the presence of a buffer solution sufficient in quantity to maintain the pH of the mixture within the range 8.5 to 7 throughout the mixing operation. The buffer solution employed can comprise a wide variety of substances. Advantageously, the buffer solution is acidic and is mixed with the solution containing hydroxide ion in sufficient amount to lower its pH to the range 8.5 to 7 prior to addition of the solution containing aluminum ions. Upon addition of the solution containing aluminum ions, crystalline aluminum hydroxide precipitate forms which is an intermediate hydrate, $$Al_2O_3 \cdot 1.2–2.6H_2O$$

of high purity and substantially free of traces of bayerite and therefore relatively stable against transformation to bayerite. As the addition of aluminum ion solution continues a drop in pH of the mixing solution can be advantageously prevented by concomitant, intermittent or continuous addition in an independent stream of a solution containing hydroxide ions.

In a preferred form of this invention the buffer solution is an aqueous solution of the salt whose cation is the same as the cation of the hydroxide employed and whose anion is the same as the anion of the aluminum salt employed. Such a buffer is formed upon reaction of the aqueous hydroxide solution and the aqueous solution of aluminum ions. For example, if ammonium hydroxide is reacted with aluminum chloride the buffer salt ammonium chloride is formed and is in solution in the supernatant liquid. Utilization of a buffer salt formed in this manner is the most preferred form of this invention. Upon filtration or decantation of the intermediate hydrate precipitate the aqueous solution of this salt is recycled to a fresh ammonium hydroxide solution. Ammonium chloride solution, having a pH of about 3, can be recycled and added to ammonium hydroxide in sufficient quantity to reduce the pH of ammonium hydroxide, having a pH of about 12, to a pH within the range 8.5 to 7. Thereupon, aqueous aluminum chloride solution is added intermittently and with thorough stirring to prevent even localized zones of pH lower than 7. Advantageously, the addition of aluminum chloride is accompanied by addition of sufficient ammonium hydroxide through an independent stream to prevent a reduction in pH of the mixture during the mixing operation.

The salts utilized in preparation of buffer solutions are advantageously ammonium salts since the ammonium ion is readily removed subsequently by volatilization. On the other hand, metallic cations are often impossible to remove completely from the alumina hydrate formed and remain as possible catalyst poisons in the event the alumina is subsequently utilized as a catalyst. Ammonium salts of strong acids produce preferred buffers such as, for example, ammonium chloride, ammonium nitrate and ammonium nitrite. If desired, buffer solutions which have a pH in the range 8.5 to 7 can be employed. Such buffers can be prepared from ammonium salts of weak acids and include ammonium salts of carboxylic acids such as, for example, ammonium formate and ammonium oxalate. Ammonium salts having anions which cannot be completely removed from the intermediate hydrate precipitate by either volatilization or washing are to be avoided. In this category are phosphates and sulfates Whichever salt is employed is dissolved in water in proper concentration to yield a buffer solution having the desired pH.

An exceptional feature of this invention is that the intermediate hydrate can be precipitated by continuous as well as batch mixing of an aqueous hydroxide solution and an aqueous solution of aluminum ions. The employment of a buffer solution as described provides a massive medium of fixed pH the addition to which of relatively small proportions of reactants does not result in appreciably altered pH nor in localized zones of pH outside of the 8.5 to 7 range. In the absence of a buffer solution the mixing operation readily produces localized regions of widely variant pH, tending to sharply reduce the purity of the intermediate hydrate product, which previously limited the mixing operation to batchwise, intermittent extremely slow addition of aluminum ion solution to ammonium hydroxide solution.

The upper temperature limit of the mixing solution can range to the boiling point of water or even higher if a pressurized vessel is employed. The upper temperature limit can range as high as 250° F., above which temperature an inadequate quantity of ammonia can be retained in solution. At high temperatures it may be necessary to maintain an atmosphere of ammonia over the mixing solution since ammonia has a strong tendency to escape from water at higher temperatures. The advantage of this invention is especially apparent at room temperatures, or broadly temperatures between the freezing point of water and 170° F. since within this range of moderate temperatures the transformation of intermediate hydrate to the trihydrate, bayerite, is relatively rapid even when the entire mixing operation occurs within the pH range 8.5 to 7.

It is important that hydroxides of alkali metals, such as sodium and potassium hydroxide, not be employed in place of ammonium hydroxide in the practice of this invention. These metals interfere with the production of the pure intermediate alumina hydrate precipitate of this invention. It appears the presence of metallic impurities such as sodium catalyzes dehydration of high alumina hydrates to the monohydrate, known as boehmite. Furthermore, in contrast to volatile ammonia, these metals remain as impurities in the hydrate which is formed, even after prolonged washings, and tend to reduce the catalytic activity of the final product. On the other hand, ammonia, being volatile, is completely vaporized during the drying operation. A further disadvantage to the use of sodium or potassium hydroxide is that trace quantities of these metals drastically inhibit the ability of a catalyst containing dehydrated alumina to undergo reactivation by the common means of burning carbonaceous impurities from the catalyst surface since these metals have low melting points and act as fluxes, tending to sinter active catalytic sites during high temperature catalyst reactivation.

A variety of aqueous solutions of aluminum salts can be employed including aqueous solutions of aluminum chloride and aluminum nitrate. Aqueous solutions of soluble aluminum salts of carboxylic acids such as aluminum formate or aluminum propionate can be employed. Aqueous aluminum sulfate solution is not advantageous since it is difficult to adequately remove sulfate from the product even by protracted washings. The molality of the aluminum salt solution and the ammonium hydroxide solution is not critical and can range between 0.1 and 4.0 molality. Dilute solutions of not more than 1 or 2 molality are preferred.

The intermediate hydrate precipitate can be separated immediately from the supernatant liquid by filtration, decanting, centrifuging, or the like and then washed, dried and calcined. After separation from the supernatant liquid the precipitate is washed until it is substantially free from the anion of the aluminum salt. The precipitate can be washed with water but is preferably washed with aqueous ammonia. It is desirable that the washing solution be maintained at a temperature above 170° F. or 180° F. in order to prevent transformation of the intermediate hydrate to bayerite during this operation. When the wash water no longer exhibits traces of chlorine, nitrate or other anion of the aluminum salt, the intermediate hydrate is dried at between about 200° F. to 300° F. to remove mechanically held water. It is then activated as a catalyst by calcining at a temperature of at least 850° F. and preferably at about 900° F. to 1000° F. to remove almost all chemically combined water and to achieve its advantageous anhydride structure. The product of calcination is $Al_2O_3$ and is opaque, colorless, hard and contains less than 3 percent by weight of water. About 90 percent of its pore volume comprises pores having a radius sufficiently small to measure between 10 and 50 Angstrom units. The product of calcination not only predominates in small pores but also has a high surface area, as determined by nitrogen adsorption tests.

EXAMPLE 1

For purposes of comparison a series of tests was made preparing alumina hydrates according to the conventional method of adding a base to a solution of an aluminum salt to form a sol and a gel. In these tests, aqueous ammonium hydroxide solution was added to aqueous aluminum chloride solution. The tests were made at room temperature. In the various tests made, the addition of ammonium hydroxide was terminated when the pH of the mixture reached 4, 5, 6 and 8, respectively. The sol existing at pH 4 was evaporated to dryness and the gels existing at pH 5, 6 and 8 were dried. All the samples were then calcined at 900° F. Table I shows the physical characteristics, obtained by nitrogen adsorption measurements, of the dried aluminas produced in each test.

*Table I*

| pH | 4 | 5 | 6 | 8 |
|---|---|---|---|---|
| Pore Volume (ml./gm.) | 0.21 | 0.32 | 0.19 | 0.34 |
| Average Pore Radius, A | 22 | 48 | 41 | 48 |
| Surface Area (m.²/gm.) | 187 | 140 | 104 | 153 |
| Pore Size Distribution, Percent by Volume/ Pore Radius, A.: | | | | |
| >200 | 0 | 1.0 | 0.8 | 0.3 |
| 100–200 | 0.3 | 2.7 | 0.4 | 1.1 |
| 50–100 | 1.0 | 36.4 | 23.3 | 37.2 |
| 40–50 | 0.5 | 16.7 | 15.8 | 16.5 |
| 30–40 | 0.7 | 26.4 | 24.8 | 26.2 |
| 20–30 | 18.0 | 16.0 | 26.1 | 17.6 |
| 10–20 | 7.87 | 0.9 | 8.7 | 1.0 |
| <10 | 0.0 | 0.0 | 0.0 | 0.0 |

It is noted that the surface areas of these aluminas are low in comparison to observed surface areas obtained from aluminas prepared in accordance with this invention as shown in the following example.

EXAMPLE 2

A series of tests was conducted employing buffered solutions. These tests were conducted at pH values both within and above the range of this invention. The tests were made by adding various quantities of ammonium chloride buffer to aqueous ammonium hydroxide solutions until pH values of 7, 8 and 9, respectively, were reached. Aqueous aluminum chloride solutions were then added in sufficiently small, intermittent increments, accompanied by vigorous stirring, to prevent significant variation in pH of the solution. The precipitates formed were first dried and then calcined at 900° F. The precipitates obtained from the pH 7 and 8 tests were each the intermediate hydrate and upon drying and calcining yielded an opaque, glassy, colorless, hard alumina product. The precipitate obtained from the pH 9 was bayerite and upon drying and calcining produced eta alumina, a chalky white, soft product. Following are the physical characteristics of each alumina product obtained.

*Table II*

| pH | 7 | 8 | 9 |
|---|---|---|---|
| Pore Volume (ml./gm.) | 0.29 | 0.35 | 0.30 |
| Average Pore Radius, A | 26 | 34 | 14 |
| Surface Area (m.²/gm.) | 225 | 210 | 409 |
| Pore Size Distribution, Percent by Volume/ Pore Radius, A.: | | | |
| >200 | 0.4 | 0.1 | 1.4 |
| 100–200 | 1.5 | 0.6 | 5.5 |
| 50–100 | 3.4 | 7.6 | 10.7 |
| 40–50 | 1.6 | 7.9 | 2.0 |
| 30–40 | 19.5 | 33.1 | 3.4 |
| 20–30 | 46.5 | 40.6 | 12.0 |
| 10–20 | 27.3 | 9.9 | 36.7 |
| <10 | 0.0 | 0.0 | 28.4 |

It is noted that the dry alumina product obtained from the intermediate hydrate possesses a considerably larger proportion of pores below 50 Angstrom units in radius as compared to the eta alumina product obtained from the bayerite hydrate.

EXAMPLE 3

A solution of $Al(NO_3)_3 \cdot 9H_2O$ was added intermittently and with rapid stirring to a dilute solution of ammonium hydroxide buffered to a pH range between 7.5 and 8.5 with ammonium nitrate solution. The pH of the mixture was maintained between 7.5 and 8.5 throughout the reaction. When the reaction was complete, the slurry was filtered and washed with water. The filter cake was dried for 16 hours at 250° F. X-ray examination of the oven dried material showed it to be the intermediate hydrate. A sample was calcined for 16 hours at 900° F. Table II shows physical data obtained on the calcined material by nitrogen adsorption tests.

Table III

| | |
|---|---|
| Pore volume, (ml./gm.) | .314 |
| Average pore radius, A. | 26 |
| Surface area (m.²/gm.) | 253 |

Pore size distribution, percent by volume/pore radius:

| | |
|---|---|
| 200–300 | 0 |
| 100–200 | .2 |
| 50–100 | 6.2 |
| 40–50 | 5.4 |
| 30–40 | 21.6 |
| 20–30 | 47.3 |
| 10–20 | 19.3 |
| –10 | 0 |

Various changes and modifications can be made without departing from the spirit of this invention or the scope thereof as defined in the following claims.

We claim:

1. A process for producing alumina comprising admixing in a solution of a buffer an aqueous acidic solution of an aluminum salt and an alkali metal-free aqueous ammonium hydroxide solution, the anion of said aluminum salt and the buffer being removable from said alumina product, said buffer solution being present prior to beginning admixing of said aluminum salt solution and said ammonium hydroxide solution, said buffer solution maintaining a basic pH in the range between 7 and 8.5 throughout the mixing operation, avoiding any pH outside the basic range between 7 and 8.5 during said admixing operation, avoiding even localized zones of pH lower than 7 during said admixing operation, precipitating a crystalline alumina hydrate containing between 1.2 and 2.6 moles of water of hydration per mole of $Al_2O_3$, separating said alumina hydrate from supernatant liquid, and drying said alumina hydrate.

2. A process for producing alumina comprising admixing in a solution of a buffer salt an aqueous acidic solution of an aluminum salt selected from the group consisting of aluminum chloride and aluminum nitrate and an alkali metal-free aqueous ammonium hydroxide solution, said buffer salt selected from the group consisting of ammonium chloride and ammonium nitrate, said buffer solution being present prior to beginning admixing of said aluminum salt solution and said ammonium hydroxide solution, said buffer solution maintaining a basic pH in the range between 7 and 8.5 throughout the mixing operation, avoiding any pH outside the basic range between 7 and 8.5 during said admixing operation, avoiding even localized zones of pH lower than 7 during said admixing operation, precipitating a crystalline alumina hydrate containing between 1.2 and 2.6 moles of water of hydration per mole of $Al_2O_3$, separating said alumina hydrate from supernatant liquid, and drying said alumina hydrate.

3. A process for producing alumina comprising adding a buffer solution of a salt selected from the group consisting of ammonium chloride and ammonium nitrate to an alkali metal-free aqueous ammonium hydroxide solution, thereupon adding an aqueous acidic solution of a salt selected from the group consisting of aluminum chloride and aluminum nitrate, said buffer solution being present prior to beginning admixing of said aluminum salt solution and said ammonium hydroxide solution, adding additional alkali metal-free aqueous ammonium hydroxide solution, said buffer solution maintaining a basic pH in the range between 7 and 8.5 throughout the admixture of aluminum salt solution with ammonium hydroxide solution, avoiding any pH outside the basic range between 7 and 8.5 during said admixing operation, avoiding even localized zones of pH lower than 7 during said admixing operation, precipitating a crystalline alumina hydrate containing between 1.2 and 2.6 moles of water of hydration per mole of $Al_2O_3$, separating said alumina hydrate from supernatant liquid, drying and calcining said alumina hydrate.

4. A process for producing alumina comprising admixing in an ammonium salt buffer solution an aqueous acidic solution of an aluminum salt and an alkali metal-free aqueous ammonium hydroxide solution, the anion of said ammonium salt buffer and of said aluminum salt being the same and being removable from said alumina product, said buffer solution being present prior to beginning admixing of said aluminum salt solution and said ammonium hydroxide solution, said buffer solution maintaining a basic pH in the range between 7 and 8.5 throughout the mixing operation, avoiding any pH outside the basic range between 7 and 8.5 during said admixing operation, avoiding even localized zones of pH lower than 7 during said admixing operation, precipitating a crystalline alumina hydrate containing between 1.2 and 2.6 moles of water of hydration per mole of $Al_2O_3$, separating said alumina hydrate from supernatant liquid, drying said alumina hydrate and calcining it at a temperature of at least 850° F.

References Cited in the file of this patent

UNITED STATES PATENTS

| | | |
|---|---|---|
| 1,337,192 | Buchner | Apr. 20, 1920 |
| 1,540,446 | Wilson | June 2, 1925 |
| 1,929,942 | Barclay | Oct. 10, 1933 |
| 1,953,201 | Tosterud | Apr. 3, 1934 |
| 1,976,875 | Connolly | Oct. 16, 1934 |
| 2,377,547 | Fuchs | June 5, 1945 |
| 2,867,588 | Keith et al. | Jan. 6, 1959 |
| 2,874,130 | Keith | Feb. 17, 1959 |
| 2,915,475 | Bugosh | Dec. 1, 1959 |
| 2,932,620 | Fuener et al. | Apr. 12, 1960 |

UNITED STATES PATENT OFFICE
CERTIFICATE OF CORRECTION

Patent No. 3,151,939            October 6, 1964

William L. Kehl et al.

It is hereby certified that error appears in the above numbered patent requiring correction and that the said Letters Patent should read as corrected below.

Column 3, line 49, for "$Al_2O_3 \cdot 1.2-2.6HO_2$" read -- $Al_2O_3 \cdot 1.2-2.6H_2O$ --; column 6, Table I, second column, line 10 thereof, for "7.87" read -- 78.7 --.

Signed and sealed this 16th day of February 1965.

(SEAL)
Attest:

ERNEST W. SWIDER
Attesting Officer

EDWARD J. BRENNER
Commissioner of Patents